(12) United States Patent
Rockwell et al.

(10) Patent No.: US 8,069,629 B2
(45) Date of Patent: Dec. 6, 2011

(54) PROCESS FOR MANUFACTURING INSULATED SIDING

(75) Inventors: Anthony L. Rockwell, Pickerington, OH (US); W. David Graham, Granville, OH (US); Donn R. Vermilion, Newark, OH (US); Kaushik Chakrabarty, Gahanna, OH (US)

(73) Assignee: CertainTeed Corporation, Valley Forge, PA (US)

( * ) Notice: Subject to any disclaimer, the term of this patent is extended or adjusted under 35 U.S.C. 154(b) by 162 days.

(21) Appl. No.: 12/536,791

(22) Filed: Aug. 6, 2009

(65) Prior Publication Data

US 2009/0301022 A1 Dec. 10, 2009

Related U.S. Application Data

(63) Continuation of application No. 11/648,073, filed on Dec. 30, 2006, now abandoned, which is a continuation-in-part of application No. 11/178,618, filed on Jul. 11, 2005, now abandoned.

(51) Int. Cl.
*E04B 2/00* (2006.01)
*E04C 1/00* (2006.01)
*E04C 1/39* (2006.01)
*E04C 2/34* (2006.01)
*D04H 1/00* (2006.01)
*D04H 5/00* (2006.01)
*D04H 1/10* (2006.01)
*B32B 27/12* (2006.01)

(52) U.S. Cl. .......... 52/588.1; 52/309.13; 52/794.1; 442/334; 442/341; 442/355; 442/394; 442/415

(58) Field of Classification Search .......... 442/320–326, 442/334, 341, 355, 394, 397, 415; 52/588.1, 52/794.1, 309.1
See application file for complete search history.

(56) References Cited

U.S. PATENT DOCUMENTS

| | | |
|---|---|---|
| 2,373,769 A | 4/1945 | Macy |
| 3,520,099 A | 7/1970 | Mattes |
| 3,556,918 A | 1/1971 | Lemelson |
| 3,826,054 A | 7/1974 | Culpepper, Jr. |
| 3,935,060 A | 1/1976 | Blome et al. |
| 4,034,528 A | 7/1977 | Sanders et al. |
| 4,047,349 A | 9/1977 | Aquilar, Jr. |
| 4,154,040 A | 5/1979 | Pace |
| 4,444,818 A | 4/1984 | Tominaga et al. |
| 4,513,045 A | 4/1985 | Bondoc et al. |
| 4,520,066 A * | 5/1985 | Athey .......... 442/338 |
| 4,543,158 A | 9/1985 | Bondoc et al. |
| 4,766,029 A | 8/1988 | Brock et al. |

(Continued)

FOREIGN PATENT DOCUMENTS

DE 19502733 3/1996

(Continued)

*Primary Examiner* — Angela Ortiz
*Assistant Examiner* — Jennifer Steele
(74) *Attorney, Agent, or Firm* — Duane Morris LLP; Gerald K. Kita (57) ABSTRACT

A siding panel assembly includes an ornamental facing and a first insulation layer made from fibrous insulating material. That fibrous insulating material includes polymer fibers and glass fibers, polymer fibers, natural fibers and mixtures thereof. A method for making the siding panel assembly includes the steps of cutting a groove in and molding a first surface of a sheet of the insulation layer to match in profile a concavity in the ornamental facing and assembling the insulation layer and the ornamental facing.

16 Claims, 11 Drawing Sheets

U.S. PATENT DOCUMENTS

| | | | |
|---|---|---|---|
| 4,969,302 A | | 11/1990 | Coggan et al. |
| 5,090,174 A | | 2/1992 | Fragale |
| 5,148,645 A | | 9/1992 | Lehnert et al. |
| 5,425,210 A | | 6/1995 | Zafir |
| 5,461,839 A | * | 10/1995 | Beck .............................. 52/519 |
| 5,526,627 A | | 6/1996 | Beck |
| 5,664,376 A | | 9/1997 | Wilson et al. |
| 5,729,946 A | | 3/1998 | Beck |
| 5,839,247 A | | 11/1998 | Beck |
| 5,857,303 A | | 1/1999 | Beck et al. |
| 5,987,838 A | | 11/1999 | Beck |
| 6,029,415 A | * | 2/2000 | Culpepper et al. ............. 52/522 |
| 6,128,866 A | | 10/2000 | Wearne |
| 6,164,032 A | | 12/2000 | Beck |
| 6,321,500 B1 | * | 11/2001 | Manning et al. ................ 52/555 |
| 6,370,382 B1 | | 4/2002 | Kang et al. |
| 6,385,585 B1 | | 5/2002 | Jonsson et al. |
| 6,415,574 B2 | | 7/2002 | Beck |
| 6,715,249 B2 | | 4/2004 | Rusek et al. |
| 7,658,051 B2 | | 2/2010 | Benes |
| 7,698,866 B2 | | 4/2010 | Mahaffey |
| 2002/0160682 A1 | * | 10/2002 | Zeng et al. .................... 442/411 |
| 2003/0032351 A1 | | 2/2003 | Horner, Jr. et al. |
| 2003/0041544 A1 | * | 3/2003 | Rusek et al. ................. 52/481.1 |
| 2003/0209305 A1 | | 11/2003 | Smith et al. |
| 2004/0023586 A1 | | 2/2004 | Tilton |
| 2004/0121110 A1 | | 6/2004 | Schmidt et al. |
| 2004/0244335 A1 | * | 12/2004 | Babbitt et al. ............... 52/796.1 |
| 2005/0005544 A1 | | 1/2005 | Borowiecki et al. |
| 2005/0150183 A1 | * | 7/2005 | Hettler et al. .............. 52/506.01 |
| 2006/0037268 A1 | | 2/2006 | Mahaffey |
| 2006/0042183 A1 | | 3/2006 | Benes |
| 2007/0009688 A1 | | 1/2007 | Haque et al. |

FOREIGN PATENT DOCUMENTS

| | | |
|---|---|---|
| EP | 0295038 | 12/1988 |
| EP | 1300511 | 4/2003 |
| JP | 2255329 | 10/1990 |
| JP | 4041794 | 2/1992 |
| JP | 11287020 | 10/1999 |
| JP | 2001303751 | 1/2001 |

* cited by examiner

PROCESS FOR MANUFACTURING INSULATED SIDING

CROSS-REFERENCE TO RELATED APPLICATIONS

This application is a continuation of U.S. application Ser. No. 11/648,073, filed Dec. 30, 2006 now abandoned, which is a continuation-in-part of U.S. application Ser. No. 11/178,618 filed Jul. 11, 2005 now abandoned, each of which is incorporated by reference in its entirety.

TECHNICAL FIELD AND INDUSTRIAL APPLICABILITY OF THE INVENTION

The present invention relates generally to the construction/wall covering art and, more particularly, to an improved insulated siding system.

BACKGROUND OF THE INVENTION

Aluminum and vinyl siding has been used for years as exterior surface coverings on buildings such as residential homes to give the buildings aesthetically pleasing appearances. However, siding made of vinyl or metal has very little insulative properties. Thus, it is common practice to install an insulating board between the siding and the building frame. The insulating board is typically in the form of a core of a foamed polymeric material such as polyurethane, polyisocyanurate, a polyurethane modified polyisocyanurate, or a phenolic resin interposed between two faces or sheets. The insulating board both inhibits the transfer of heat across the wall of the building and provides support for the siding.

Although known insulated siding systems may provide improved thermal insulation properties over non-insulated siding systems, they still may allow significant airflow which may adversely affect the overall thermal properties of the building. Additionally, foamed insulation boards offer very little compressibility and almost no resiliency to conform to surface variations or anomalies. As a result of this, small spaces and air gaps are often found between the insulation board and the ornamental facing of the siding as well as between the insulation board and the sheeting to which the siding assembly is attached. Such gaps and air spaces channel air around the insulation and tend to reduce the "R-rating" of the siding system. Since conventional foam insulated siding typically has a low R-value, the beneficial effects of the insulated siding may be quickly degraded as a result.

In addition, foam insulation is relatively brittle and breaks easily. As a consequence, it typically cannot be manufactured in thicknesses of less than 3/16 in. (0.476 cm) and withstand breaking during handling and installation. As a result it is generally not practical to make an insulated siding panel assembly with foam insulation having a thickness of approximately 3/4 in. (1.905 cm) for installation, for example, in standard new-construction window and door trim accessories. This is primarily due to the tapered profile of the siding, which in order to achieve 3/4 inch maximum at the thickest point, results in a portion of the foam being tapered to less than 3/16 of an inch thick to fit into conventional standard 3/4 inch trim (such as j-channels, window trim, etc)—which results in breakage and difficult manufacturing conditions.

A need is therefore identified for an improved siding panel assembly incorporating an insulation layer made from fibrous material with desirable compressibility and resiliency properties to accommodate anomalies and eliminate spaces and gaps for better overall thermal insulative effect. The resiliency and compressibility also allows the insulation layer to be made thinner than possible with foam insulation and have the necessary structural integrity to withstand handling and installation without breaking. Further, the new insulation layer is preferably less brittle and provides improved impact resistance for the siding assembly and may provide improved R-values.

SUMMARY OF THE INVENTION

In accordance with the purposes of the present invention as described herein, an improved siding panel assembly is provided. The siding panel assembly comprises an ornamental facing and a first insulation layer made from fibrous insulating material. That fibrous insulating material is selected from a group of materials consisting of glass fibers, polymer fibers, natural fibers and mixtures thereof. More specifically, the fibrous insulating material is selected from a group of materials consisting of glass fibers, polyolefin fibers, polyester fibers, polypropylene fibers, polyethylene fibers, polyethylene terephthalate fibers, polybutylene terephthalate fibers, cotton fibers, hemp fibers, jute fibers, kenaf fibers, rayon fibers, nylon fibers, acrylic fibers, copolyester fibers and mixtures thereof. The fibrous insulating material has a compressive strength of between about 14 and about 220 pounds of force and a wet and dry recovery of at least 98%.

In one possible embodiment of the present invention the first insulation layer is a nonwoven mat. The fibers in the mat are continuous and have a preferred diameter of between about 2.0 and about 60.0 microns. In another possible embodiment the fibers in the mat are chopped to a preferred length of between about 0.635 to about 7.62 cm and have a preferred diameter of between about 2.0 and about 60.0 microns.

In yet another possible embodiment the first insulation layer is a nonwoven veil. In one possible embodiment the fibers in the veil are continuous and have a preferred diameter of between about 2.0 and about 60.0 microns. In another possible embodiment the fibers in the veil are chopped to a preferred length of between about 0.635 to about 7.62 cm and have a preferred diameter of between about 2.0 and about 60.0 microns.

In one possible embodiment the first insulation layer comprises by weight percent preferably between about 10 to about 70% glass fibers and about 90 to about 30% polymer binder fibers. The glass fibers have a preferred length of between about 0.635 to about 7.62 cm and a preferred diameter of between about 2.0 to about 25.0 microns. The polymer binder fibers have a preferred length of between about 1.20 to about 7.62 cm and a preferred diameter of between about 8.0 to about 40.0 microns.

In yet another possible embodiment the first insulation layer comprises 100% polyester fibers. Those polyester fibers have a preferred length of between about 1.20 to about 7.62 cm and a preferred diameter of between about 8.0 to about 40.0 microns. Further the insulation layer has a preferred density of between about 0.7 Lbs/cubic foot and about 3.0 Lbs/cubic foot.

In accordance with an additional aspect of the present invention the siding panel assembly may further include a second insulation layer. The first insulation layer is sandwiched between the ornamental facing and the second insulation layer. The second insulation layer may preferably be constructed from a material selected from a group consisting of glass fibers, polymer fibers, natural fibers, EVA and mixtures thereof. Still further the assembly may include a film backing or a foam board. Typically the film backing is a breathable film and is made from a material selected from a group consisting of polypropylene, polyethylene, polyolefin and mixtures thereof.

In accordance with another aspect of the present invention the ornament facing is constructed from a material selected from a group consisting of fiberglass, vinyl, polyvinyl chloride, aluminum, steel, ABS, concrete, other polymer materials, and mixtures thereof. The ornamental facing also includes a concavity having a contoured face. The first insulation layer has a first face that substantially matches and engages the contoured face and a second, flat face. Preferably the assembly has a total thickness of about 1.905 cm to correspond to the width of the J-channel generally provided on standard housing products such as prefab window and door frames.

In accordance with still another aspect of the present invention, a method is provided. That method comprises making a siding panel assembly by molding a first surface of a sheet of fibrous insulating material to match in profile a concavity in a sheet of ornamental facing and engaging the molded sheet of fibrous insulating material in the concavity of the sheet of ornamental facing. The method includes the step of cutting a channel in the first surface of the sheet of fibrous insulating material before molding. This is followed by the step of heating and shaping the fibrous insulating material with rollers, mechanical formed shoes (cooling plates), presses, or with belts. The method also includes the step of feeding the fibrous insulating material from a roll. Still further the method includes fastening the sheet of fibrous insulating material to the sheet of ornamental facing with an adhesive, chemical welding, ultrasonic welding, vibration welding, mechanical entrapment or mechanical fasteners.

In the following description there is shown and described several different embodiments of this invention, simply by way of illustration of some of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain certain principles of the invention. In the drawing.

Reference will now be made in detail to the present preferred embodiment of the invention, an example of which is illustrated in the accompanying drawings.

DETAILED DESCRIPTION AND PREFERRED EMBODIMENTS OF THE INVENTION

Figure 1:
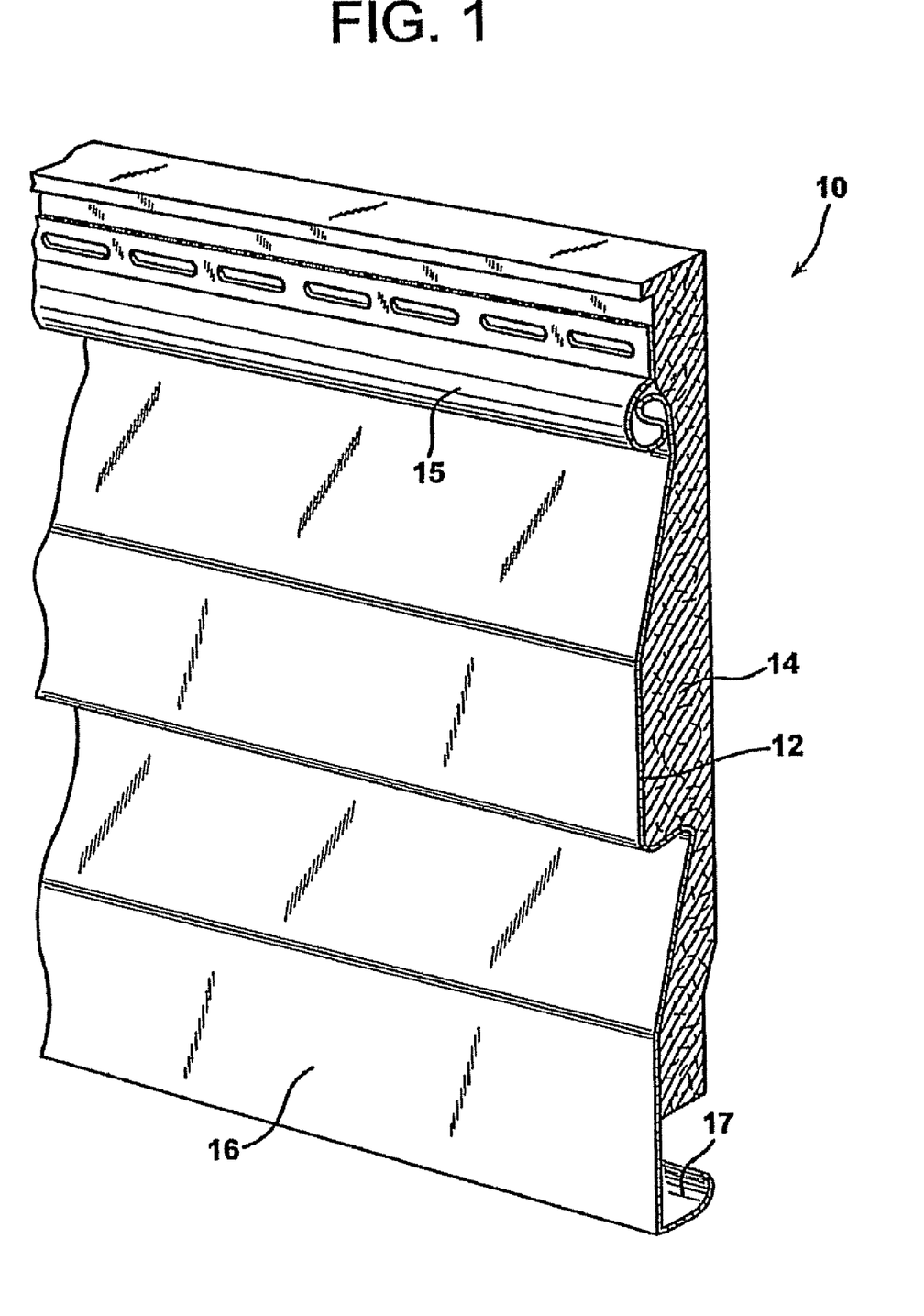
FIG. 1 is a perspective view of the siding panel assembly of the present invention.

Reference is now made to FIG. 1 which illustrates the siding panel assembly 10 of the present invention. As illustrated in the FIG. 2a embodiment, the siding panel assembly 10 incorporates an ornamental facing 12 and a first insulation layer 14. The ornamental facing 12 preferably includes a tongue 15 at one end and a groove 17 at the opposite end to allow one siding panel assembly 10 to be connected to another by lapping margins in a manner well known in the art. The ornamental facing 16 may be constructed from any number of appropriate materials including but not limited to fiberglass, vinyl, polyvinyl chloride, aluminum, steel, ABS, other polymers, concrete, wood, natural fibrous materials, and mixtures thereof. The ornamental facing 12 may include an exposed, textured face 16 made, for example, to look like wood siding.

Figure 2A:
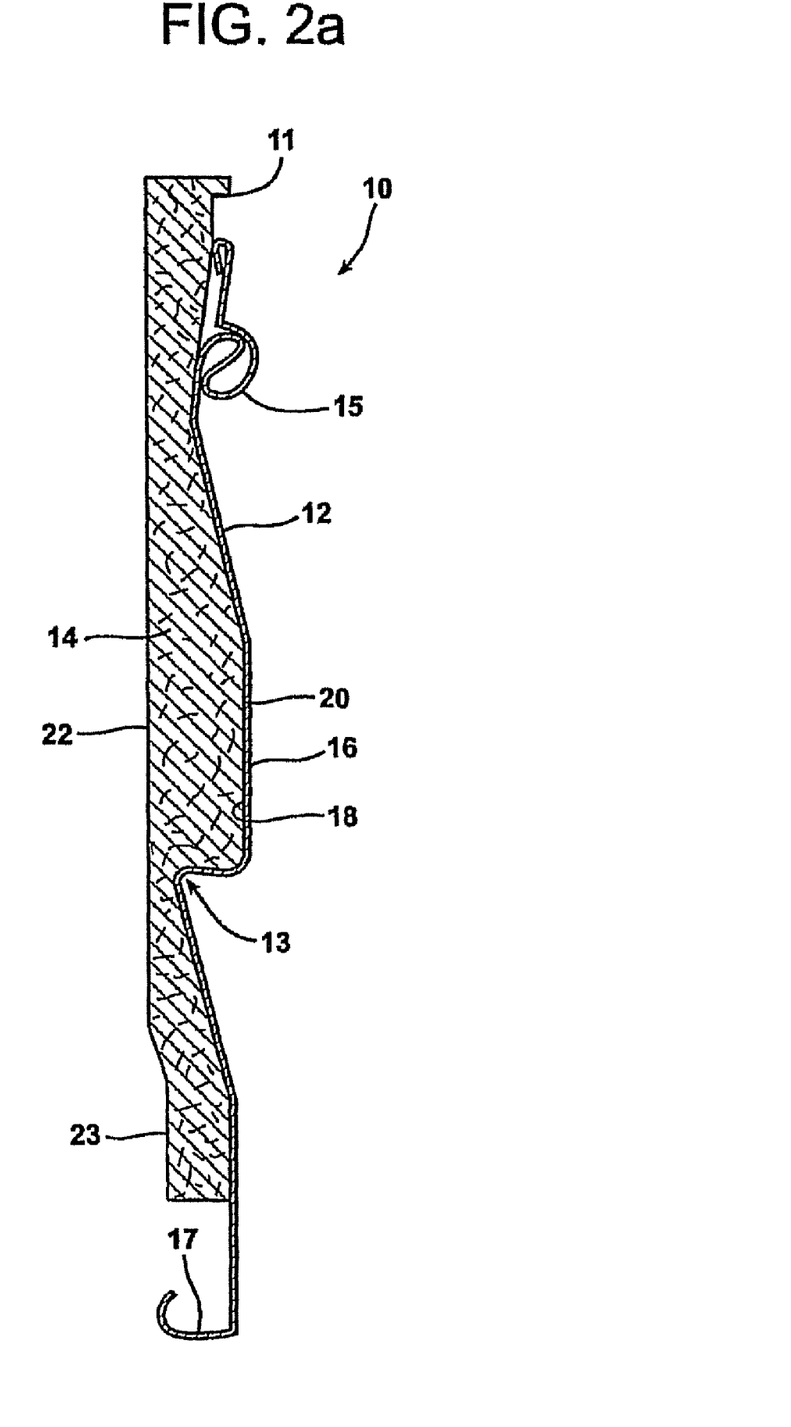
FIGS. 2a-2d are end elevational views illustrating four possible embodiments of the siding panel assembly of the present invention.

As further illustrated in FIG. 2a, the ornamental facing 12 includes a concavity formed by the contoured rear face 18. This shaping of the ornamental facing 12 functions to provide the exposed face 16 with a relief that mimics traditional wood siding while the concavity formed by the rear face 18 receives and holds the first insulation layer 14. More particularly, the first insulation layer 14 has a first face 20 that substantially matches and engages the contoured rear face 18 of the ornamental facing 12. Additionally, the first insulation layer 14 has a second, substantially flat face 22 for continuously engaging/abutting the structural sheeting to which the siding panel assembly 10 is attached. As illustrated in FIG. 2a, the substantially flat face 22 may include a slight recess 23 at one end adjacent the groove 17 to better accommodate the connection of the siding panel assembly 10 to another such assembly, and in particular when the adjacent panel has insulation extension 11 projecting from the nail flange. Advantageously, the first insulation layer 14 is characterized by the necessary compressibility and resiliency to eliminate gaps and air spaces with the ornamental facing 12 on one side and the structural sheeting on the other, particularly when the insulation extension 11 is mated to the recess 23 in a compressed manner. Thus, pathways for thermal intrusion are minimized or eliminated and maximum insulative benefit is achieved.

The fibrous insulating material of the first insulation layer 14 may be constructed from glass fibers, polymer fibers, natural fibers and mixtures thereof. More specifically, the fibrous insulating material is typically selected from a group of materials consisting of glass fibers, polyolefin fibers, polyester fibers, polypropylene fibers, polyethylene fibers, polyethylene terephthalate fibers, polybutylene terephthalate fibers, cotton fibers, hemp fibers, jute fibers, kenaf fibers, rayon fibers, nylon fibers, acrylic fibers, copolyester fibers and mixtures thereof. Fibrous insulating material incorporating glass fibers, polyester fibers and combinations thereof are particularly effective for construction of the first insulation layer 14 due to their combination of dimensional stability, thermal insulation, acoustic insulation, antimildew, impact resistance, compressibility and resiliency properties. Obviously, glass fibers also possess very desirable fire resistance characteristics. Additional known additives may be included to provide desirable characteristics, such as fire resistance, mold resistance, pest resistance, mechanical properties, and the like. Likewise other layers may be provided to afford properties, such as fire or flame resistance, or such as a Kevlar fabric, to provide ballistic properties.

The first insulation layer 14 may preferably take the form of a nonwoven mat. In one possible embodiment the fibers in the mat are continuous and have a preferred diameter of between about 2.0 and about 60.0 microns. In another possible embodiment the fibers in the mat are preferably chopped to a length of between about 0.635 to about 7.62 cm and preferably have a preferred diameter of between about 2.0 and about 40.0 microns.

In still another possible embodiment the first insulation layer 14 is a nonwoven veil. The fibers in the veil may be continuous and preferably have a preferred diameter of between about 2.0 and about 40.0 microns or preferably chopped to a length of between about 0.635 to about 7.62 cm and preferably have a preferred diameter of between about 2.0 and about 40.0 microns.

Still further, the first insulation layer 14 may preferably comprise by weight percent between about 10 to about 70% glass fibers and about 90 to about 30% polymer binder fibers. Typically the glass fibers, when chopped, preferably have a length of between about 0.635 to about 7.62 cm and preferably a diameter of between about 2.0 to about 20.0 microns. Typically the polymer fibers have a preferred length of between about 2.54 to about 7.62 cm and a preferred diameter of between about 8.0 to about 40.0 microns.

In yet another possible embodiment the first insulation layer 14 comprises 100% polyester fibers. Such fibers typically preferably have a length of between about 1.20 to about 7.62 cm and a preferred diameter of between about 8.0 to about 40.0 microns. The density of a 100% polyester first insulation layer 14 is preferably typically between about 0.7 Lbs/cubic foot and about 3 Lbs/cubic foot and more typically between about 1.5 Lbs/cubic foot and about 3.0 Lbs/cubic foot.

By constructing the first insulation layer 14 from fibrous insulating material, a number of benefits and advantages are achieved. For example, insulated siding panel assemblies 10 of relatively thin profile may be constructed. Insulated siding products of the prior art backed with an expanded foam, such as polystyrene foam, cannot be contoured to thin profiles without breaking, particularly at the nail hem end, including the insulation projection 11, and at the knee portion 13 between the siding profiles. As a consequence, these prior art sidings cannot be effectively constructed with the necessary profile of approximately 1.905 cm thickness so as to be compatible with standard window and door trim accessories currently utilized in new home construction. Significantly, the present assemblies 10 can be installed in a retrofit or residing application without using unique trim or components, or may be used in a new build with the typical ¾ inch trim.

In addition, the fibrous insulating material utilized to construct the first insulation layer 14 of the siding panel assembly 10 has a compressive strength of between about 14 and 220 pounds of force as measured by ASTM C 165-00 and a wet and dry recovery of at least 98% as measured by ASTM C 165-00. Advantageously, the compressibility of the fibrous insulating material allows the first insulation layer 14 to compress and accommodate inconsistencies or small variations in the surface being covered and form a compression fit between the insulation extension 11 and the next course of siding. This is particularly beneficial in replacement siding applications as in many instances it allows the siding panel assembly 10 to lay properly directly over the surface being covered. Further, the resiliency of the fibrous insulating material allows the first insulation layer 14 to recover its shape and thereby continuously engage the surface being covered so as to virtually eliminate gaps and air spaces that might otherwise reduce the insulating value of the siding panel assembly 10.

Since expanded polystyrene foam does not share the compressibility and resiliency properties of the fibrous insulating material utilized in the present invention, prior art insulated siding cannot provide these unique benefits. In fact, prior art insulated siding typically requires the use of furring strips to accommodate surface imperfections. By eliminating the need to use furring strips, the siding panel assembly 10 of the present invention provides significant cost savings in both materials and labor, and further permits the use of existing windows, trim & accessories, or at least enables the contractor to choose from a wider variety of products. It should also be appreciated that the compressibility and resiliency characteristics of the first insulation layer 14 allow the siding panel assembly 10 to better accommodate different coefficients of expansion and contraction between the ornamental facing 12 and the material (e.g. plywood, Tyvek® wrap or the like) upon which the assembly 10 is anchored.

Figure 2B:
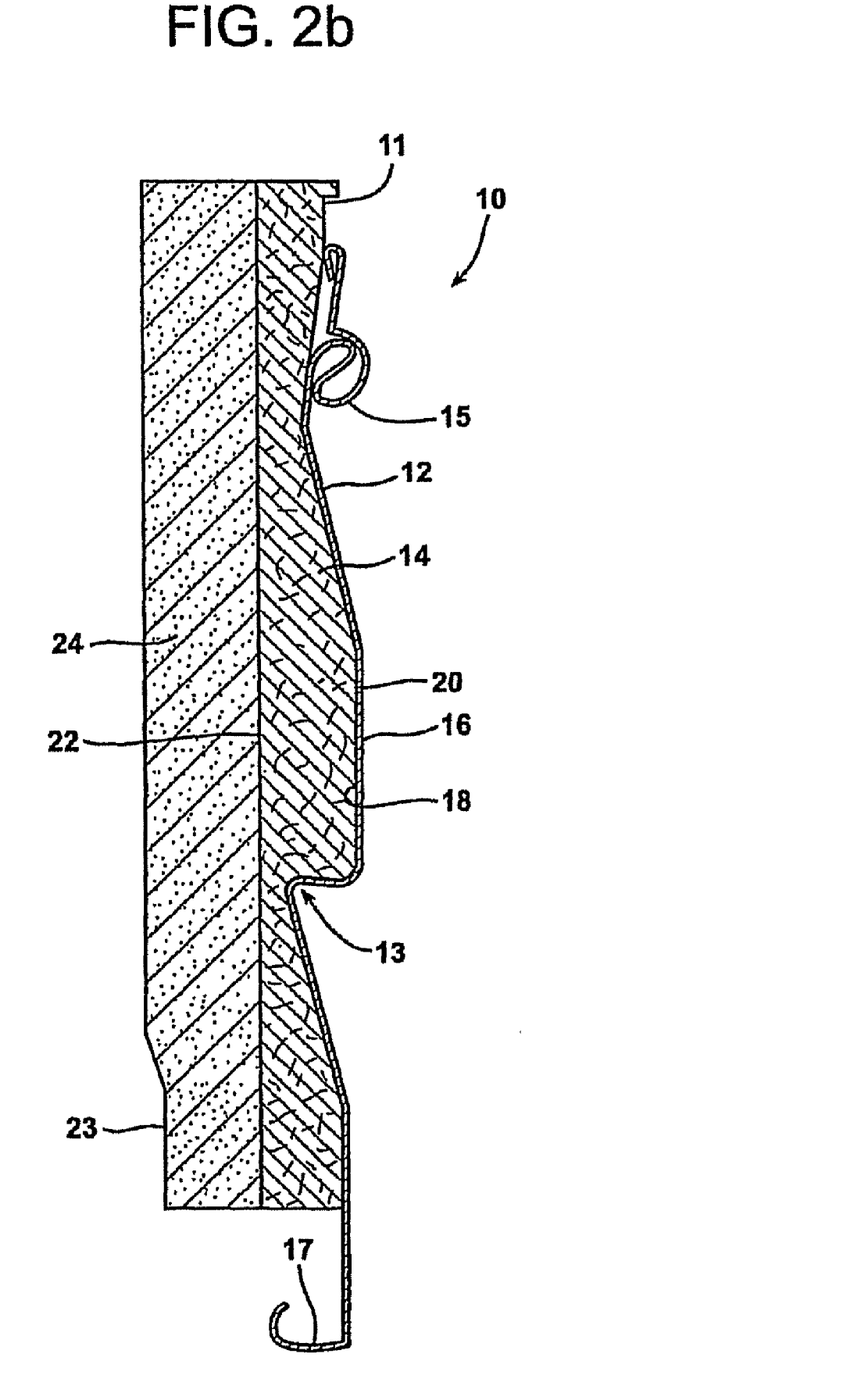

One possible alternative embodiment of the present invention is illustrated in FIG. 2b. This embodiment of the siding panel assembly 10 incorporates an ornamental facing 12 and a first insulation layer 14 substantially as described above with respect to the FIG. 2a embodiment. In addition, the assembly 10 includes a second insulation layer 24. The second insulation layer 24 engages the second face 22 of the first insulation layer 14 so that the first insulation layer is sandwiched between the second insulation layer and the ornamental facing 12.

The second insulation layer 24 may be constructed from a material selected from a group consisting of glass fibers, polymer fibers, natural fibers, EVA and mixtures thereof. Alternatively, the second layer 24 is foam. More specifically, the second insulation layer 24 may be constructed from glass-fibers, polyolefin fibers, polyester fibers, polypropylene fibers, polyethylene fibers, polyethylene terephthalate fibers, polybutylene terephthalate fibers, cotton fibers, hemp fibers, jute fibers, kenaf fibers, rayon fibers, nylon fibers, acrylic fibers, copolyester fibers and mixtures thereof. The second insulation layer 24 may be a nonwoven mat or a nonwoven veil similar to the first insulation layer 14. A high loft material may be used for the second insulation layer 24 to further enhance the thermal and/or acoustical insulating properties of the siding panel assembly 10. Advantageously, the added thickness of the multiple insulation layers 14, 24 provides a greater R-factor for better thermal and acoustical insulating properties than a single layer 14 alone.

In another possible embodiment, the second layer 24 may comprise a structural material such as Foamular®, a rigid foam insulation as described in U.S. Pat. No. 6,715,249 and available from the assignee of the present invention or Tyvek® sheeting as available from E.I. du Pont de Nemours and Company. When properly secured to supporting framing studs, such a structural insulated siding panel assembly 10 could be utilized as the outside structure of the building without any other sheeting. Such a product is particularly useful for manufactured housing. Of course, the siding panel assembly 10 could also include both a high loft insulation layer and a rigid foam structural insulation layer in addition to the first insulation layer 14 and ornamental facing 12 if desired. It should be appreciated that the second insulation layer 24 can be made from substantially any suitable material or materials in order to achieve desired thermal values, acoustics, fire resistance characteristics and mechanical properties to meet, for example, local building codes or customer requirements.

Figure 2C:
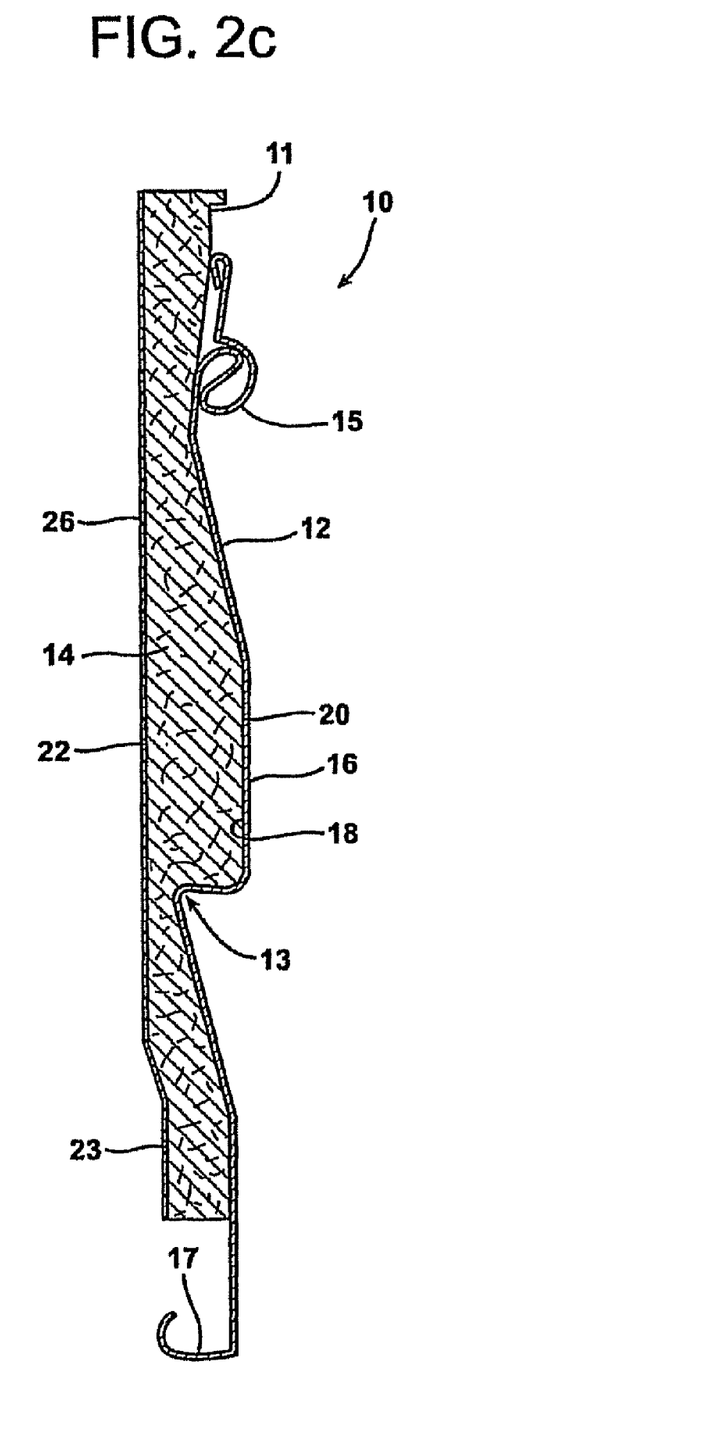

Yet another embodiment of the present invention is illustrated in FIG. 2c. This embodiment of the siding panel assembly 10 incorporates an ornamental facing 12 and first insulation layer 14 identical to that described above with respect to the FIG. 2a embodiment. In addition, the second face 22 of the first insulation layer 14 is covered with a film backing 26. For most applications the film backing is a breathable film. The film backing 26 may be made from a material selected from a group consisting of polypropylene, polyethylene, polyolefin and mixtures thereof.

Figure 2D:
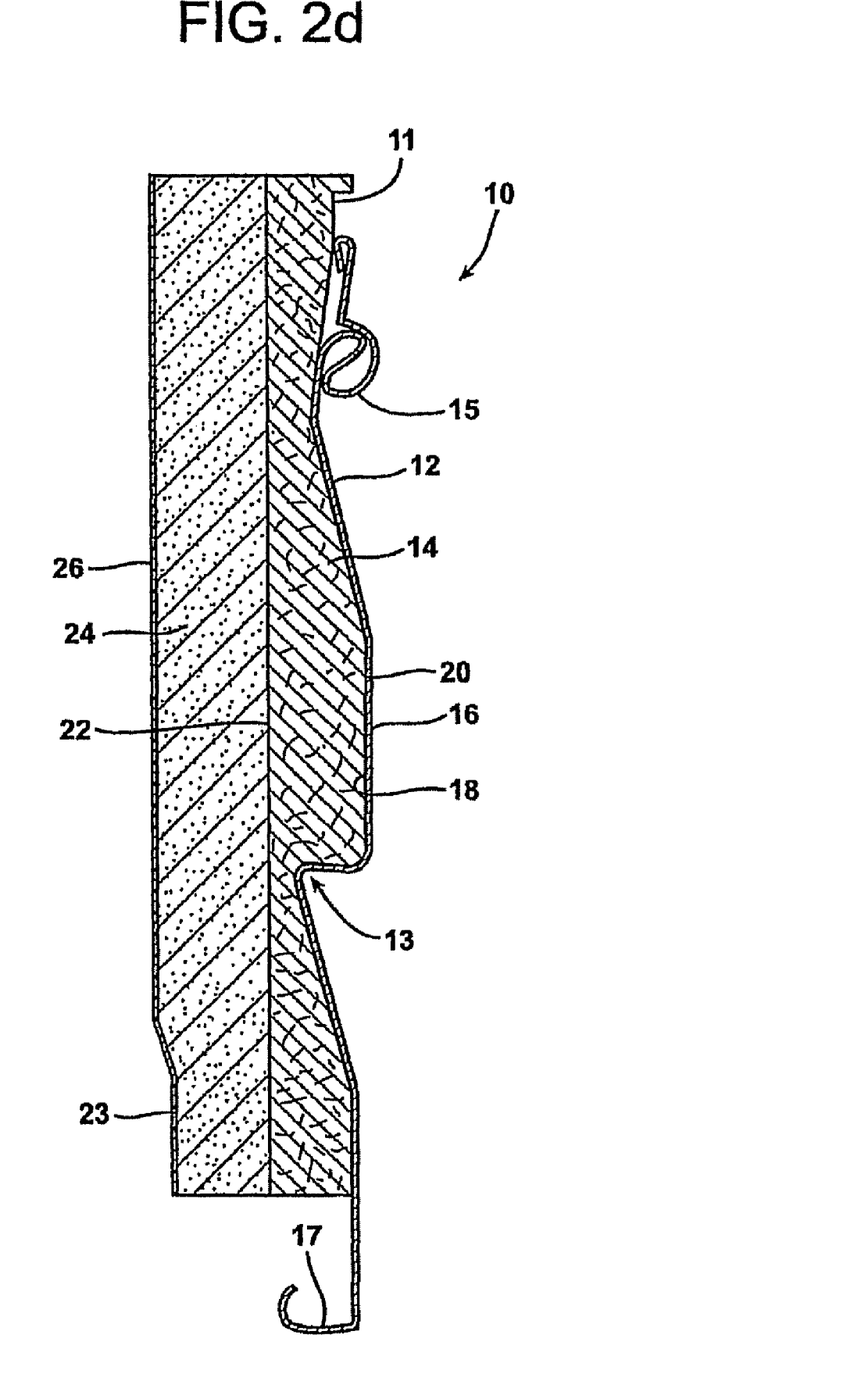

Still another embodiment of the present invention is illustrated in FIG. 2d. The siding panel assembly 10 in this figure incorporates an ornamental facing 12, first insulation layer 14, second insulation layer 24 and film backing 26 corresponding to those structures previously described for the embodiments of FIGS. 2a-2c. The various components are arranged so that the first insulation layer 14 is sandwiched between the ornamental facing 12 and the second insulation layer 24 while the second insulation layer 24 is sandwiched between the first insulation layer 14 and the film backing 26.

Still further, the siding panel assembly 10 may include a foil, a metalized film or a breathable layer between the first insulation layer 14 and the second insulation layer 24. The foil or film may have an emissivity, or a coating providing an emissivity, to improve the thermal properties of the system.

Figure 3:
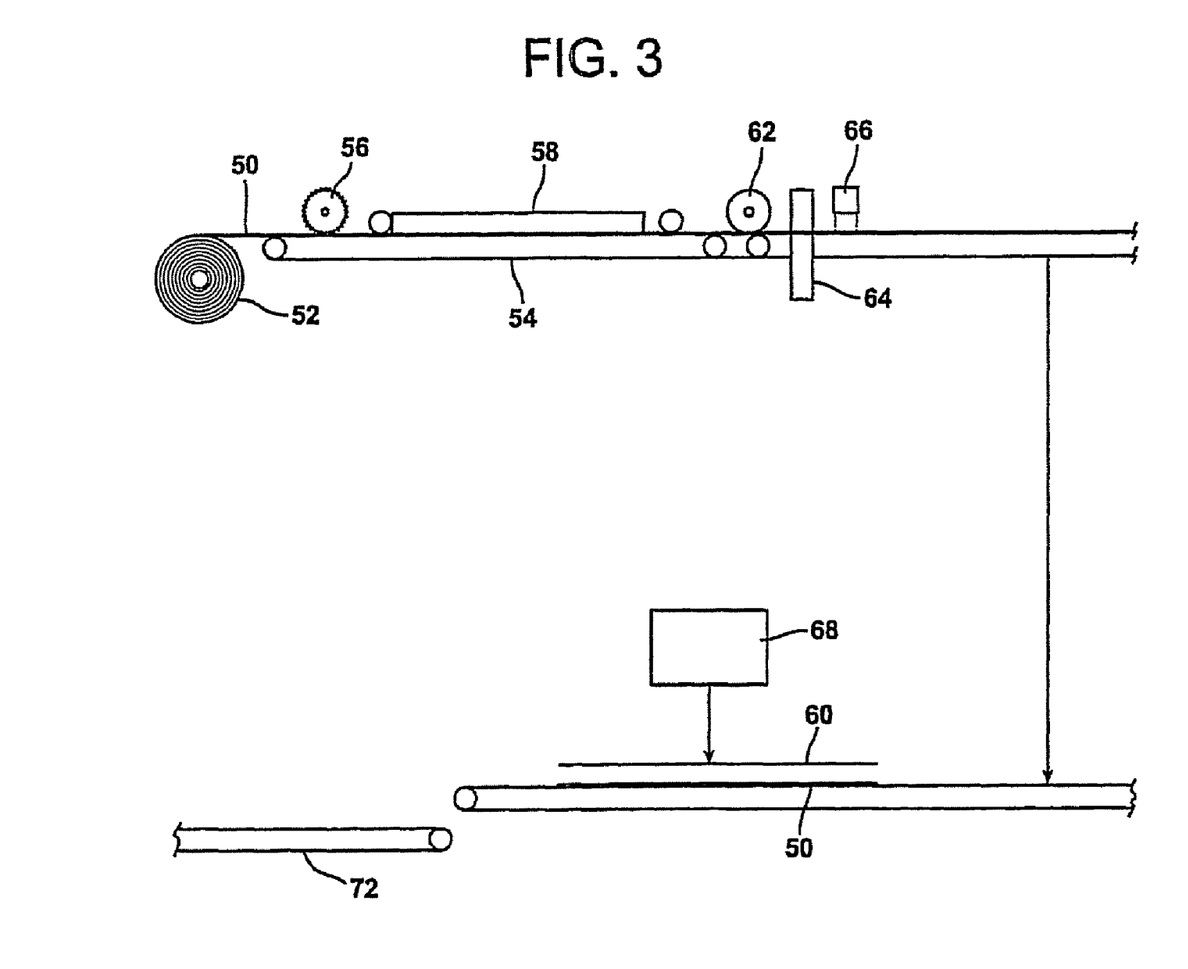
FIGS. 3 and 4 are schematical side elevational illustrations of, respectively, cold molding and surface treatment molding processes for molding the insulation layer to conform to the contoured cavity on the rear face of the ornamental facing of the siding panel assembly.
Figure 4:
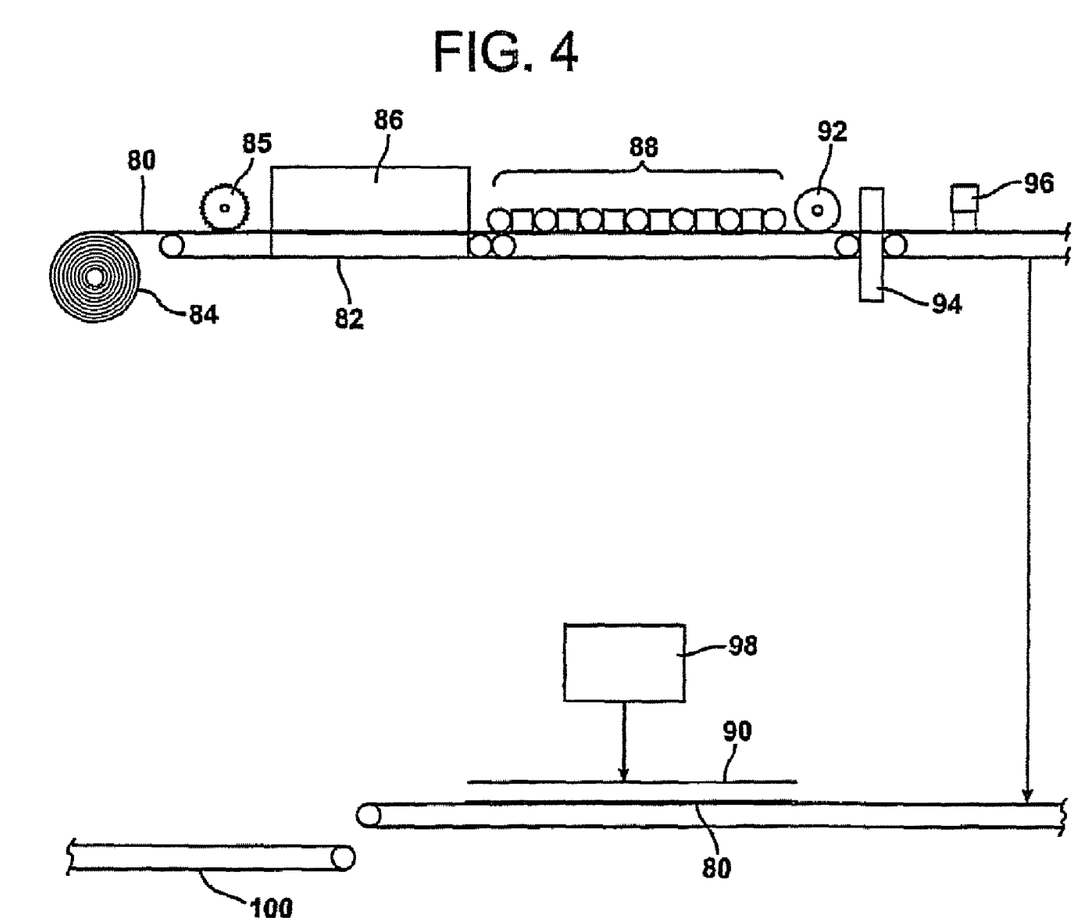

Reference is now made to FIGS. 3 and 4 which illustrate two possible methods for producing the siding panel assembly 10 of the present invention. FIG. 3 illustrates a surface treatment molding process for making the siding panel assembly 10. As illustrated a sheet of fibrous insulating material 50 is fed from a roll 52 by means of a conveyor 54. Preferably, a rotary saw 56 first cuts a channel in the sheet of fibrous material. The sheet of fibrous material 50 is fed through a surface treatment unit where the material is first heated then cooled between belts made with polytetrafluoroethylene in order to mold or shape the first surface of the sheet of fibrous insulating material 50 to match in profile a concavity in a sheet of ornamental facing 60. The channel facilitates improved shaping of the insulation to better conform to the siding profile. The line may also include an edge trimming blade 62 and/or a slitter 64 for cutting the sheet of fibrous insulating material 50 to a desired length.

In the illustrated embodiment an applicator 66 applies an adhesive to the first face of the sheet of fibrous insulating material 50. The adhesive may be any adhesive exhibiting suitable tack and adhesive strength, and is preferably a pressure sensitive adhesive. The adhesive may be "flexible" or "rigid." For many applications a rigid adhesive provides the best performance. Types of adhesives useful in the present invention include but are not limited to hot melt adhesives, epoxies, acrylates and polyvinyl acetate based systems. Exemplary of a "flexible" adhesive is Duro-Tak adhesive. Exemplary of a "rigid" adhesive is Nyatex adhesive 20 L 1625/LP33-4. The cut sheet of fibrous insulating material 50 is then preferably conveyed by the conveyor 54 to a press 68 that engages the molded sheet of fibrous insulating material in the concavity of the sheet of ornamental facing 60 and provides the necessary pressure to activate the adhesive. The now completed siding panel assembly 10 is then delivered to a board stacker or boxing conveyor 72 for additional processing and handling.

FIG. 4 illustrates a cold molding process for making the siding panel assembly 10. In this process a sheet of fibrous insulating material 80 is fed by means of a conveyor 82 from a roll 84. A channel is preferably cut into the sheet of fibrous insulating material 80 by the rotary saw 85. The sheet of fibrous insulating material 80 is then fed through a steam or forced air oven 86 to preheat the material to, for example, 300 degrees F., a temperature sufficient to soften the binder fibers in the sheet of fibrous insulating material. The conveyor 82 then conveys the sheet of fibrous insulating material 80 through shape rollers and cooling shoes 88 that function to mold a first surface of the sheet of fibrous insulating material to match in profile a concavity in a sheet of ornamental facing 90. Next the sheet 8Q is fed through an edge trimmer blade 92 and a length slitter 94 to provide a sheet of molded fibrous insulating material 80 of desired size. Alternatively, the sheet 80 may be cut to length and placed in a press (not shown) to form the sheet to the desired profile. The sized sheet of fibrous insulating material 80 is then fed through an applicator 96 that applies an adhesive to the first surface, as described with reference to FIG. 3. After this the sheet of fibrous insulating material 80 is fed by the conveyor 82 into a press 98. The press 98 functions to engage the molded sheet of fibrous insulating material 80 in a concavity of a sheet of ornamental facing 90 and applies the necessary pressure to activate the pressure sensitive adhesive and adhere the two sheets together. The finished siding panel assembly 10 is then delivered by the conveyor 82 to a board stacker, boxing conveyor 100 or other appropriate equipment for packaging.

The processes illustrated in FIGS. 3 and 4 provide for the securing of the sheet of fibrous insulating material 50, 80 and ornamental facing 60, 90 together with an adhesive. It should be appreciated, however, that other fastening systems may be used including but not limited to chemical welding, radio frequency welding, vibration welding, mechanical entrapment, mechanical fasteners such as hook and loop fasteners and ultrasonic welding. Further, for certain applications, no positive attachment may be provided between the two layers.

The quality of an ultrasonic weld is determined by the amplitude of the ultrasonic vibrations, the energy supplied and the application time. A third material or tie layer may be provided between the ornamental facing 12 and first insulation layer 14 when ultrasonic welding. The tie layer should ideally have a softening point between the softening point of the material used to make the facing 12 and the material used to make the insulation layer 14. Such a tie layer provides tack when hit with the ultrasonic vibrations thereby reducing the welding time and increasing the strength of the weld. Appropriate materials for the tie layer include but are not limited to ethylene-vinyl acetate (EVA) copolymer films, ethyleneethyl acetate copolymer films and ethylene ionomer films.

In summary, numerous benefits result from employing the siding panel assembly 10 of the present invention. New home construction typically uses a 0.75 inch (1.905 cm) thick siding due to the use of standardized window and door trim accessories. The insulated siding products of the prior art incorporate a foam insulation backing that cannot be contoured to the thin profiles necessary for use with these standardized accessories without breaking. In contrast, the fibrous insulating material used in the present invention can be molded to fit this thin profile without breaking. Further, the material is still strong enough to allow installation without damage. The fibrous insulating material also offers additional thermal and acoustical properties as well as mechanical support and impact resistance for the ornamental facing. Thus, a stronger siding product results. Still further, the fibrous insulation layer 14 includes compressibility and resiliency characteristics that allow the siding panel assembly 10 to readily accommodate anomalies in the surface being covered. As a consequence, the improved siding panel assembly 10 of the present invention may often be suited for direct application over the surface to be covered thereby eliminating the need to use furring strips at great cost savings.

It should also be appreciated that by varying the material and thickness of the second insulation layer 24 it is possible to custom design and easily manufacture a siding product to meet specific customer needs or unique area building codes. Where higher R values are required, a thicker, high loft fibrous insulation material may be used. Variable depth accessories may be provided to accommodate the different thicknesses in the different designs of siding panel assemblies 10.

Figure 5A:
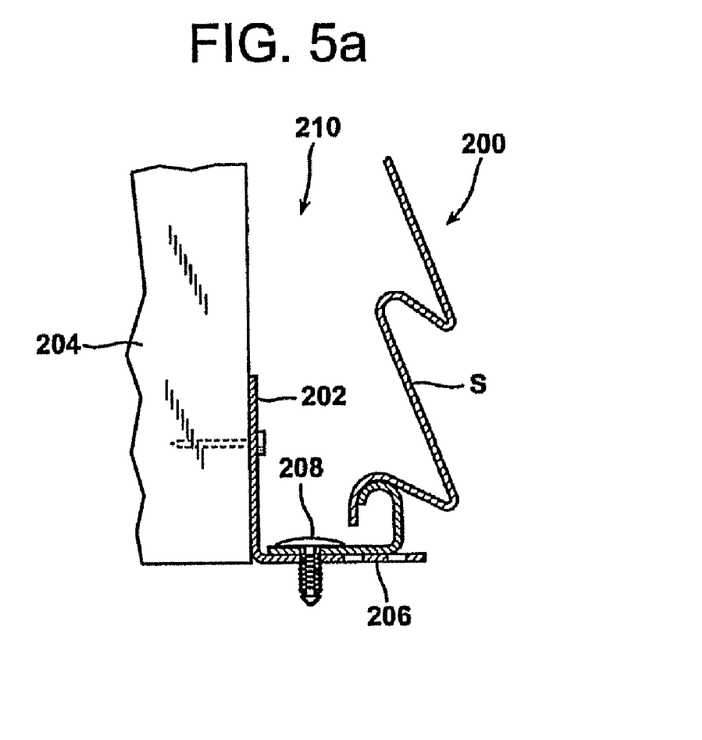
FIGS. 5a and 5b are schematical end elevational views illustrating an adjustable starter strip for receiving and holding a siding panel assembly of the present invention.
Figure 5B:
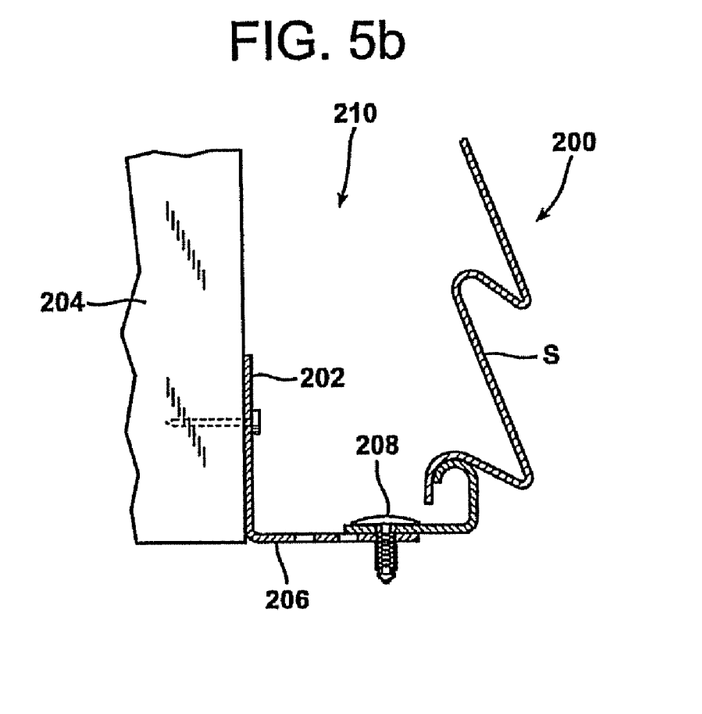

FIGS. 5a and 5b illustrate a starter strip 200 including an L-shaped bracket 202 that is fastened to the exterior wall sheeting S of the structure by nails, screws or the like, an ornamental base 204, a mounting clip 206 secured to the base and a "Christmas Tree" fastener 208. The bracket 202 and clip 206 may be provided with a series of apertures. By shifting the clip 206 relative to the bracket 202 and engaging different sets of aligned apertures in the clip and the bracket with the fastener 208 it is possible to provide a channel or groove 210 able to accommodate a relatively thin siding (FIG. 5a) or a relatively thick siding (FIG. 5b) or anything in between. Alternatively, the Christmas tree fasteners 208 may be replaced by a number of known fasteners, such as rivets, or alternatively may comprise integrally formed fasteners such as tabs and slots formed within the bracket 202 and clip 206 in a known manner.

Figure 6:
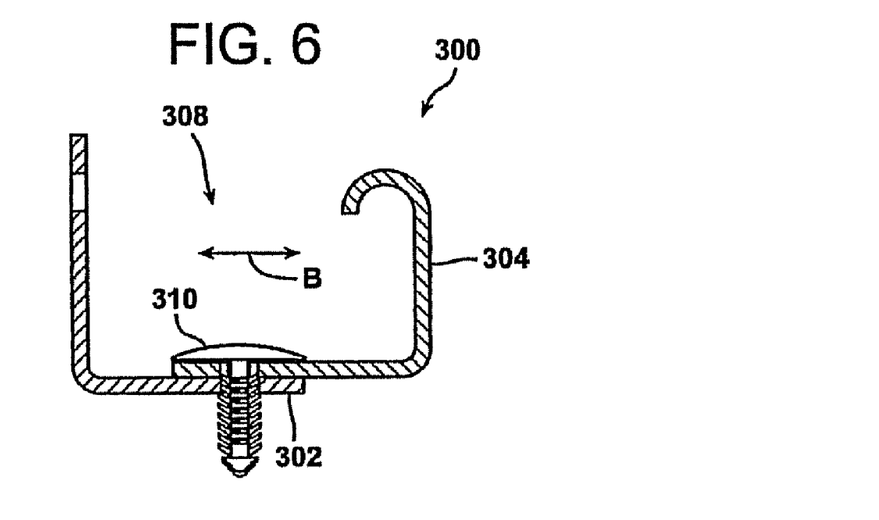
FIG. 6 is a schematical end elevational view illustrating an adjustable J-channel for receiving and holding a siding panel assembly of the present invention.

An adjustable J-channel 300 is illustrated in FIG. 6. Such a J-channel may be provided, for example, on prefabricated window and door assemblies to receive and hold siding or may be provided as an independent trim piece. The J-channel includes a pair of cooperating L-shaped elements 302, 304. The elements 302, 304 include a series of apertures. The elements 302, 304 may be shifted relative to one another (note action arrow B) to widen or narrow the channel 308 defined therebetween to receive relatively thick or thin siding assemblies. A fastener 310 is then engaged in aligned apertures in the elements 302, 304 to secure the elements together with the desired channel width.

Figure 7:
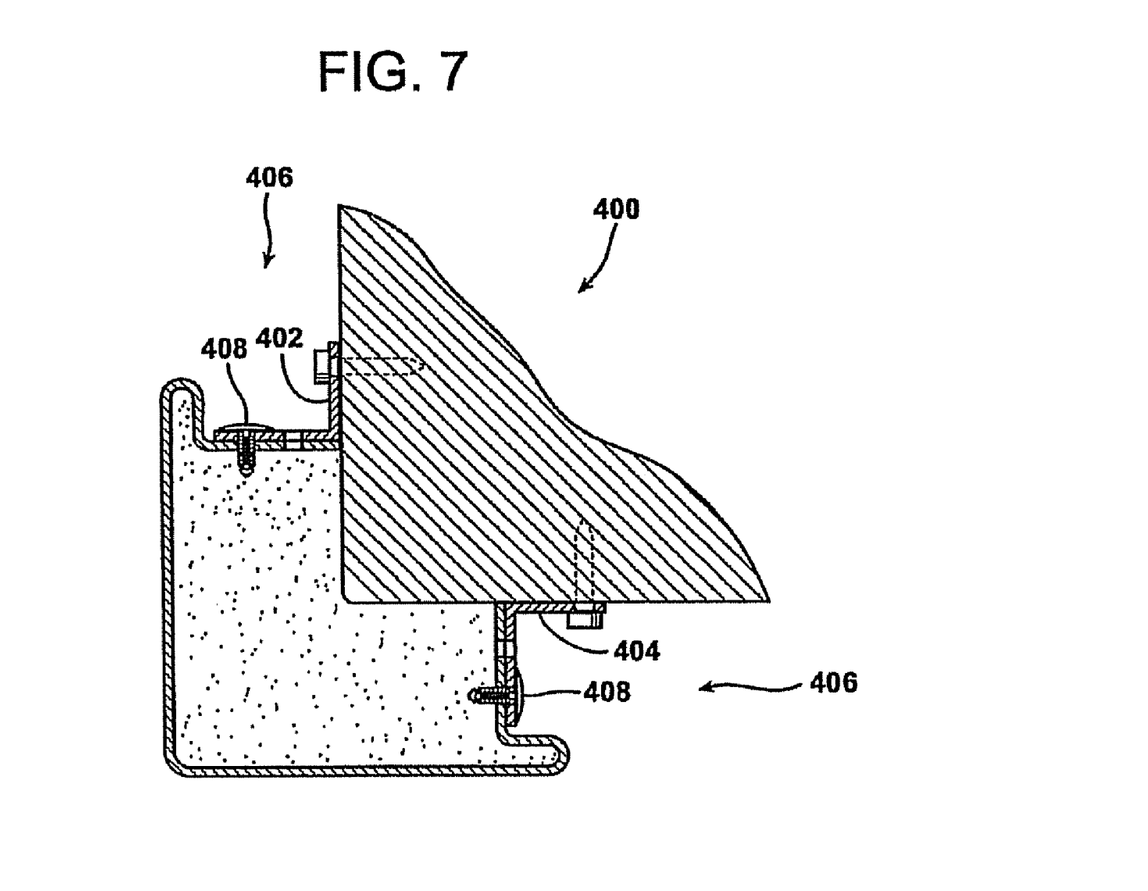
FIG. 7 is a schematical end elevational view of an adjustable inside corner assembly for receiving and holding a siding panel assembly of the present invention.
Figure 8:
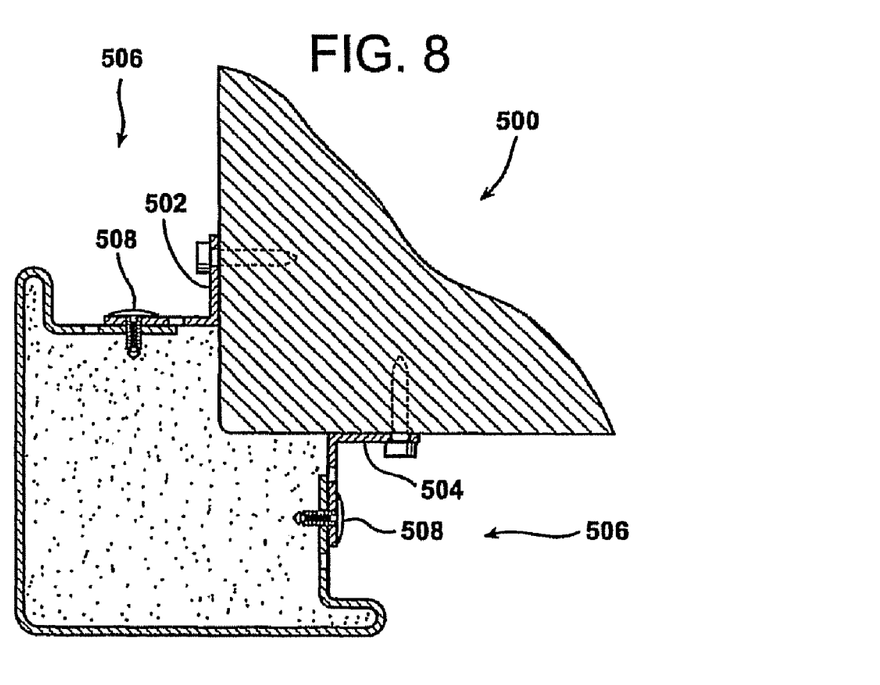
FIG. 8 is a schematical end elevational view of an adjustable outside corner assembly for receiving and holding a siding panel assembly of the present invention.

The construction for an adjustable outside corner assembly 400 and adjustable inside corner assembly 500 are illustrated respectively in FIGS. 7 and 8. The outside corner assembly 400 includes two cooperating elements 402, 404 that are adjusted with respect to each other to provide a channel 406 of desired width to receive siding and then fastened together with a fastener 408. The inside corner assembly 500 also includes two cooperating elements 502, 504 that are positioned with respect to each other to provide a channel 506 of desired width to receive siding and then fastened together with a fastener 508.

If desired, the starter strip 200, J-channel 300, outside corner assembly 400 and inside corner assembly 500 could all include a layer of fibrous insulation similar to the layer 14 described above and/or foam insulation.

The foregoing description of the preferred embodiments of the invention have been presented for purposes of illustration and description. It is not intended to be exhaustive or to limit the invention to the precise form disclosed. Obvious modifications or variations are possible in light of the above teachings. For example, siding accessories such as the corner post support members illustrated in U.S. Pat. No. 5,664,376 may incorporate a fibrous insulating material layer of the type described above with respect to the layer 14. The modular housing industry might use large siding panel assemblies 10 incorporating a structural component such as described with respect to the FIG. 2b embodiment with the second layer 24 constructed from rigid foam insulation. Such assemblies 10 may be as large as four feet in width and forty or fifty feet in length. The ornamental facing 12 and structural panel 24 of rigid foam insulation in such a product could be positively fixed together by flexible mechanical fasteners (similar to an Avery Denison type polymer fastener) inserted through weep holes provided along the length of the ornamental facing with or without an adhesive over one or more surfaces. Such fastening provides extra structural integrity along intermediate portions of large surface area assemblies 10 to resist wind loading and oil canning.

Figure 9A:
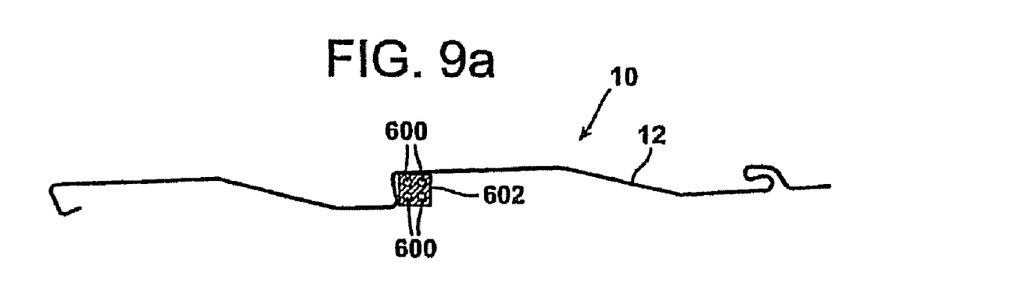
FIGS. 9a-9f are schematical end elevational views illustrating several possible ways to increase the flex resistance of the siding panel assembly of the invention in order to improve handling characteristics.
Figure 9B:
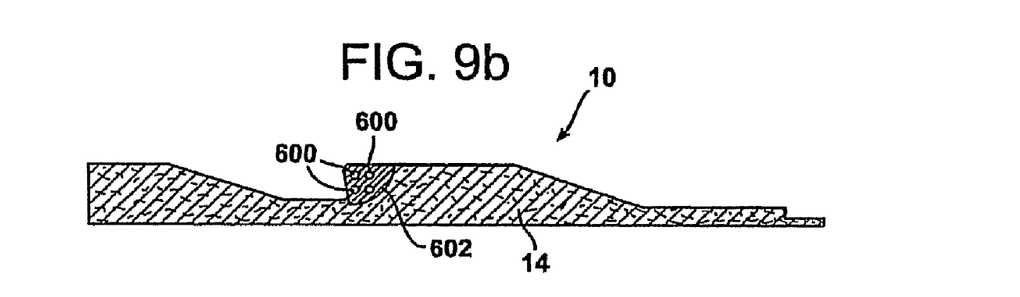

Reference is now made to FIGS. 9a and 9b which illustrate how to increase the flex resistance of the siding panel assembly 10. Because a siding panel assembly 10 is typically thin, it has a tendency to flex or droop and can even buckle when it is held in the middle or on the end with the face plane parallel to the ground. This makes it difficult for one person to handle the siding panel assembly 10 such as when passing such an assembly from the ground floor to a higher floor in windy conditions.

As illustrated in FIG. 9a, fiberglass rods, strands or rovings 600 are laid along the length of the ornamental facing 12 in the concavity formed by the rear face 18. A thermosetting resin 602 is applied along the fiberglass 600 so as to substantially surround the fiberglass. The resin is then cured by using temperature or ultraviolet radiation to rigidify the assembly. The resin selected adheres to both the fiberglass 600 and the facing 12. The fiberglass 600 is illustrated in FIG. 9a as running along the center butt region. It should be appreciated, however, that the fiberglass 600 may be provided at one or more places and is not limited to placement along the center butt region.

The insulation layer 14 may be rigidified as illustrated in FIG. 9b. As illustrated, fiberglass rods, strands or rovings 600 are laid along the center butt region of the insulation layer 14. Again, a thermosetting resin 602 is applied along the fiberglass 600 so as to substantially surround the fiberglass. The resin is then cured to rigidify the insulation layer 14. The resin selected adheres to both the fiberglass 600 and the insulation layer 14. Alternatively, the reinforcement may comprise a piece of steel, aluminum, or other material adhered to the substrate.

Preferably, the resin selected for use in either embodiment illustrated in FIGS. 9a and 9b is selected to adhere to the fiberglass 600, the ornamental facing 12 and the insulation layer 14. Thus, the resin or adhesive can be used to join the entire assembly 10 together. The resulting assembly 10 is characterized by a significant increase in rigidity. In one test case, a Summit Manor D4.5 DL siding was laid flat and clamped on a table such that a six-foot length was allowed to over hang from the edge of a table. The far end drooped thirty inches downwards from the plane of the tabletop. In the same test, a Summit Manor D4.5 DL siding with six T30 rovings and cured resin along the length of the center butt (see FIG. 9a) drooped only seventeen inches, thereby demonstrating significantly increased flex resistance. In one embodiment, the reinforcement was applied to only the middle portion of the siding, and achieved satisfactory reinforcement. IN one embodiment, a 4 ft. long reinforcement piece was adhered to the middle third of a 12 ft. long piece of siding. In this embodiment, several materials and various cross sections were trialed, including those described above.

Figure 9C:
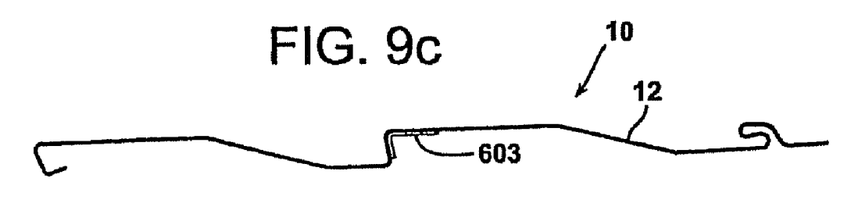
Figure 9D:
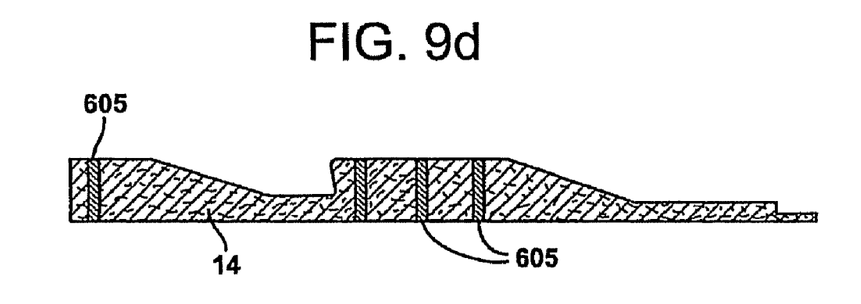
Figure 9E:
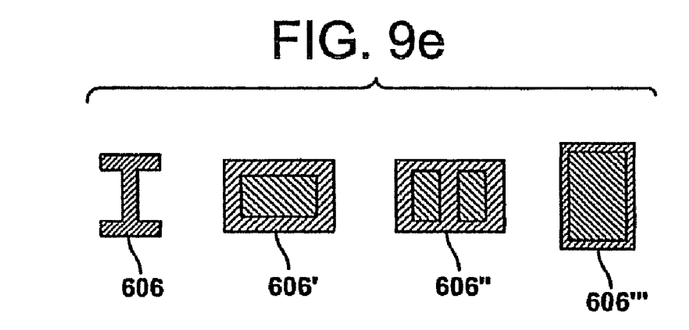
Figure 9F:
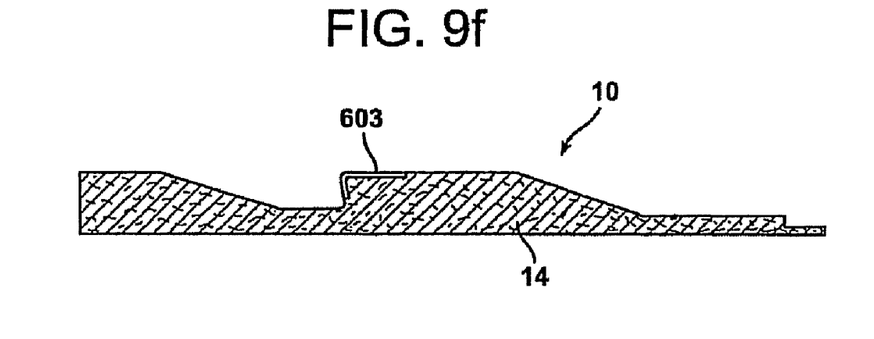

As shown in FIGS. 9c-f, a number of other methods of reinforcing the panel or insulation may be employed. In these embodiments, the reinforcement may comprise other materials including metals, polymers, cardboard, composite materials, and other known materials. As shown in these embodiments, particularly in FIG., 9e, the section may comprise a number of engineering sections to provide sufficient strength in a given material system and configuration to improve the rigidity of the system. As illustrated in FIG. 9c, the alternative reinforcement (material and/or cross section) may be attached to the siding 12. As shown in FIGS. 9d and 9f, the reinforcement may be attached to the insulation to provide the rigidity. As shown in FIG. 9d, more than one reinforcement may be attached to the panel (either the insulation 14 or siding 12) to achieve improved reinforcement and may better resist twisting of the panel. Furthermore, the inventors have discovered that the reinforcement need reinforce only a portion of the panel or insulation to provide adequate rigidity for the assembled (insulated) panel. In a preferred embodiment, the reinforcement covers the middle third of the panel.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment do not and are not intended to limit the ordinary meaning of the claims and their fair and broad interpretation in any way.

What is claimed is:

1. An exterior siding panel assembly for connection to another such siding panel assembly, comprising:
    an ornamental facing and a resilient, compressible insulation layer;
    a first end of the ornamental facing having a tongue to mate with a groove of another such siding panel assembly, and a groove in a second end of the ornamental facing to mate with a tongue of an ornamental facing of another such siding panel assembly;
    the resilient, compressible insulation layer being contoured with a profile engaging a contoured rear face of the ornamental facing;
    a projecting insulation extension is at one end of the resilient, compressible insulation layer and a recess in the resilient, compressible insulation layer adjacent the groove in the second end of the ornamental facing;
    the projecting insulation extension at the one end of the resilient, compressible insulation layer projecting from the ornamental facing to mate in a compressed manner with another recess in a resilient, compressible insulation layer of another such siding panel assembly, and wherein the projecting insulation extension and the resilient, compressible insulation layer are compressible to eliminate air gaps;
    the recess is in the resilient, compressible insulation layer to mate in a compressed manner with a projecting insulation extension that projects from an ornamental facing of another such siding panel assembly, wherein the projecting insulation extension and the resilient, compressible insulation layer are compressible to eliminate air gaps; and
    the resilient, compressible insulation layer comprising fibrous insulation material with polymer binder fibers having a profile of approximately 1.905 cm thickness to correspond to the width of J-channel on housing products, and a compressive strength of between about 14 and 220 pounds of force as measured by ASTM C 165-00 and a wet and dry recovery of at least 98% as measured by ASTM C 165-00 for resisting breakage to compress and accommodate variations in a surface being covered by the siding panel assembly.

2. The assembly of claim 1, wherein said insulation layer comprises by weight percent between about 10 to about 70% glass fibers and about 90 to about 30% polymer binder fibers.

3. The assembly of claim 2, wherein said glass fibers have a length of between about 0.635 to about 7.62 cm and a diameter of between about 2.0 to about 25.0 microns and said polymer binder fibers have a length of between about 1.20 to about 7.62 cm and a diameter of between about 8.0 to about 60.0 microns.

4. The assembly of claim 1, wherein said insulation layer comprises 100% polyester fibers having a length of between about 1.20 to about 7.62 cm and a diameter of between about 8.0 to about 60.0 microns.

5. The assembly of claim 1, wherein said insulation layer has a density of between about 0.7 Lbs/cubic foot and about 3 lbs/cubic foot.

6. The assembly of claim 1, wherein the fibers comprise about 90% to about 30% polymer binder fibers.

7. The assembly of claim 1, comprising:
    an adhesive adhering said insulation layer to the ornamental facing.

8. The assembly of claim 1, comprising:
    a further insulation layer, wherein said resilient, compressible insulation layer is sandwiched between said further insulation layer and said ornamental facing.

9. The assembly of claim 8, wherein said further insulation layer is constructed from glass fibers, polymer fibers, natural fibers, EVA, foam or a mixture thereof.

10. The assembly of claim 1, comprising: a film backing on said resilient, compressible insulation layer.

11. The assembly of claim 10, wherein said film backing is breathable.

12. The assembly of claim 10, wherein said film backing comprises polypropylene, polyethylene, polyolefin or mixtures thereof.

13. The assembly of claim 1, wherein said ornamental facing is constructed from fiberglass, vinyl, polyvinyl chloride, aluminum, steel, ABS or a mixture thereof.

14. The assembly of claim 1, comprising:
    a fiberglass rod, strand or roving running along at least one of said ornamental facing and said insulation layer; and
    a thermosetting resin substantially surrounding the fiberglass rods, strand or rovings to rigidify the assembly.

15. The assembly of claim 1, comprising:
    a tie layer between the insulation layer and the ornamental facing, wherein the tie layer has a softening point between the softening point of the ornamental facing and the softening point of the insulation layer.

16. The assembly of claim 15 wherein the tie layer includes, but is not limited to ethylene-vinyl acetate (EVA) copolymer film, ethylene-ethyl acetate copolymer film or ethylene ionomer film.

* * * * *